N. POWER.
MOTION PICTURE MACHINE.
APPLICATION FILED NOV. 21, 1914. RENEWED DEC. 10, 1920.
1,423,452.
Patented July 18, 1922.
4 SHEETS—SHEET 2.
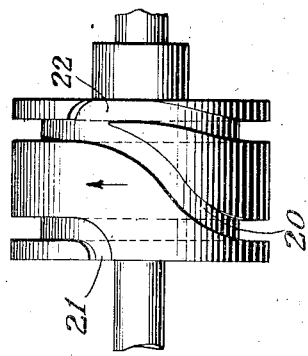
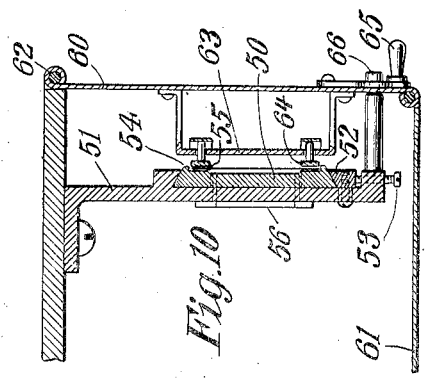
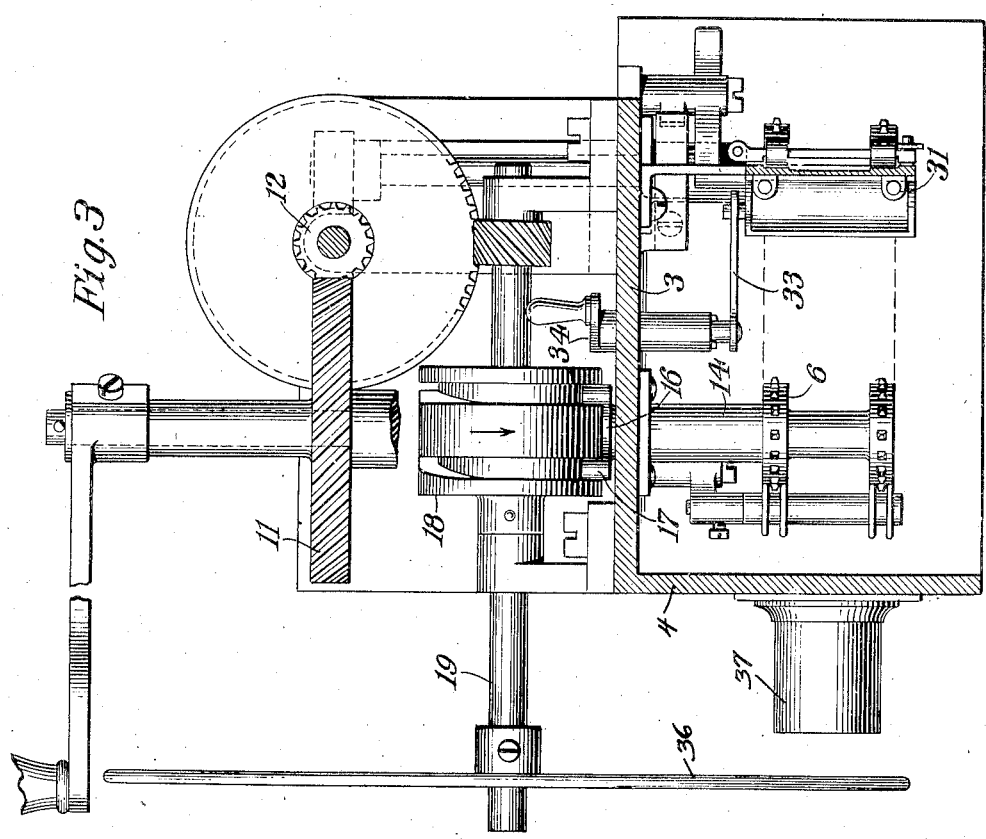

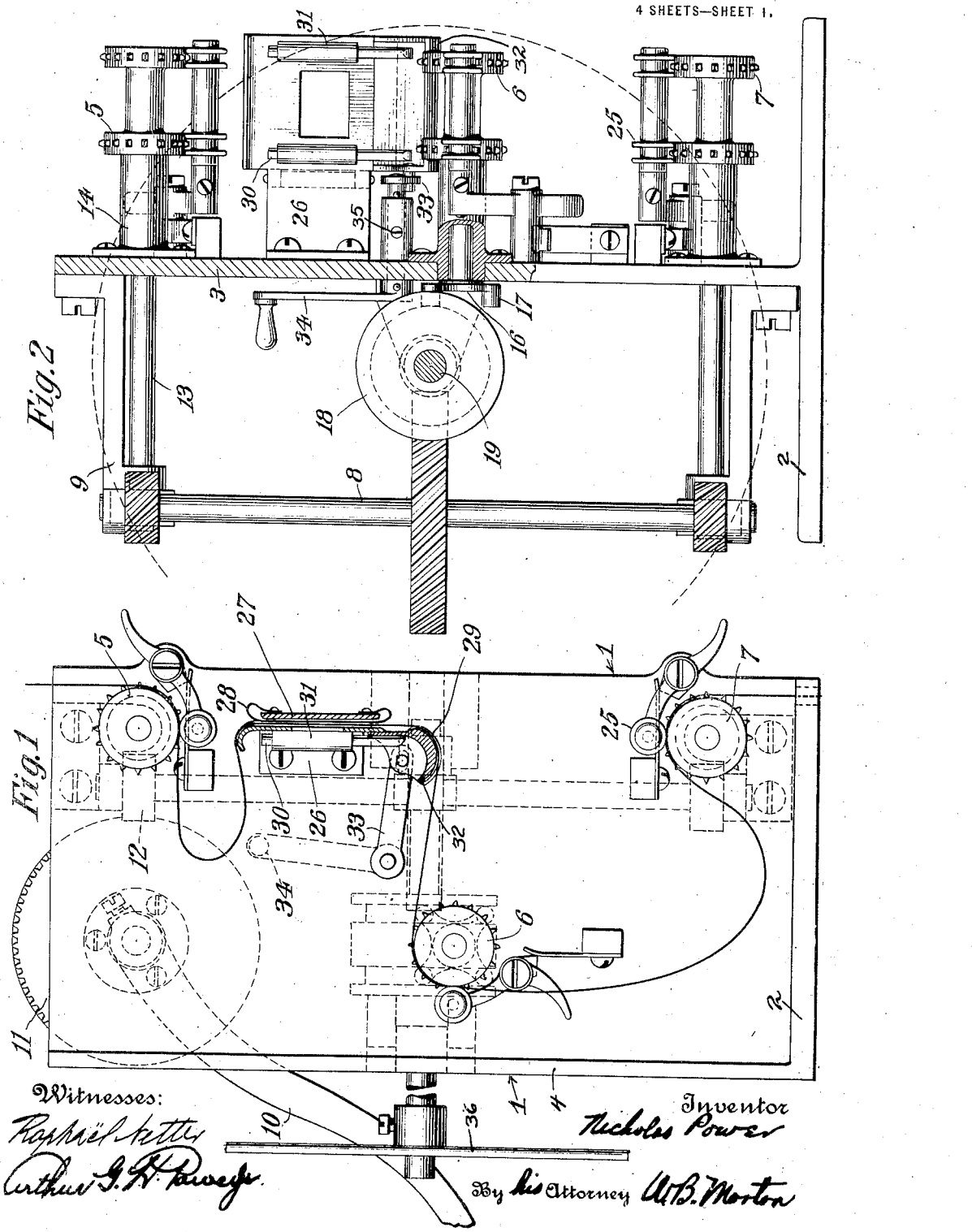

N. POWER.
MOTION PICTURE MACHINE.
APPLICATION FILED NOV. 21, 1914. RENEWED DEC. 10, 1920.
1,423,452.
Patented July 18, 1922.
4 SHEETS—SHEET 3.
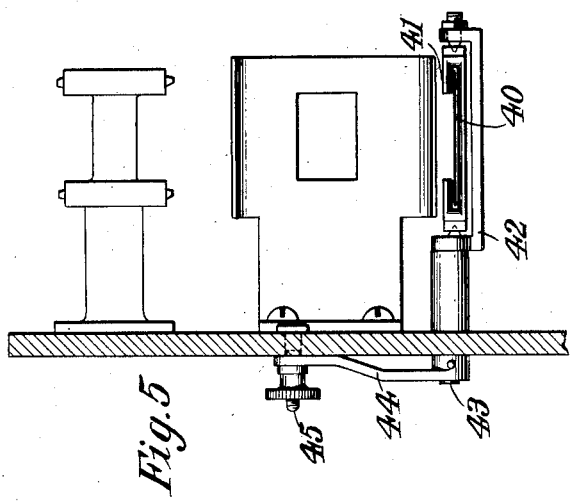
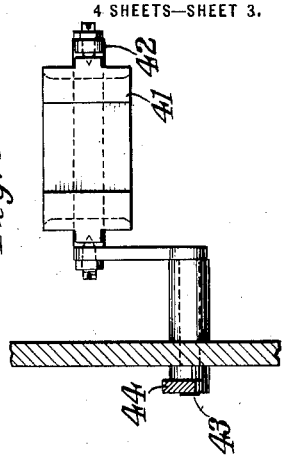
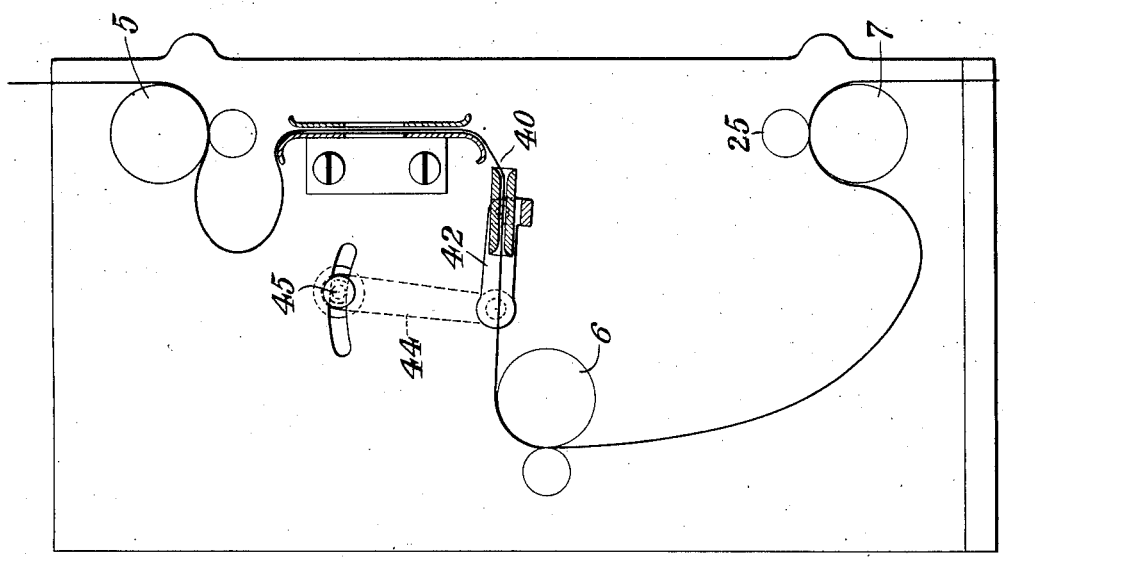

N. POWER.
MOTION PICTURE MACHINE.
APPLICATION FILED NOV. 21, 1914. RENEWED DEC. 10, 1920.
1,423,452.
Patented July 18, 1922.
4 SHEETS—SHEET 4.
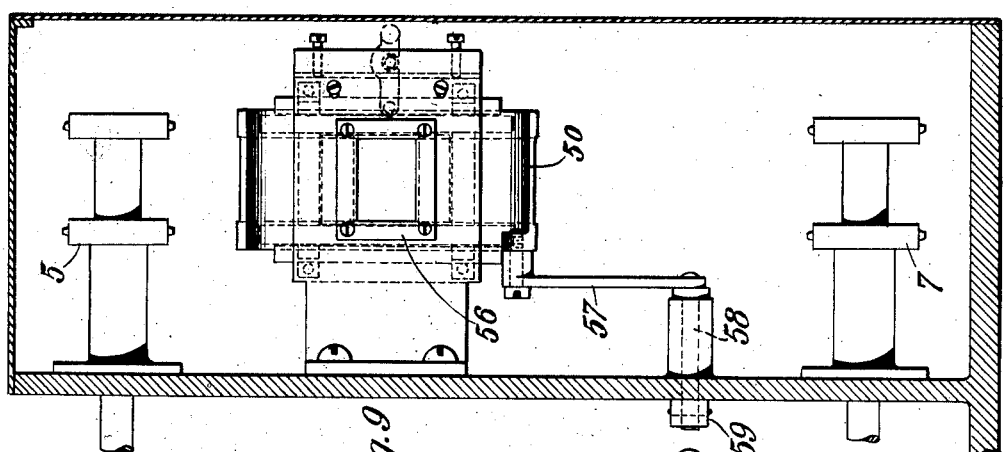
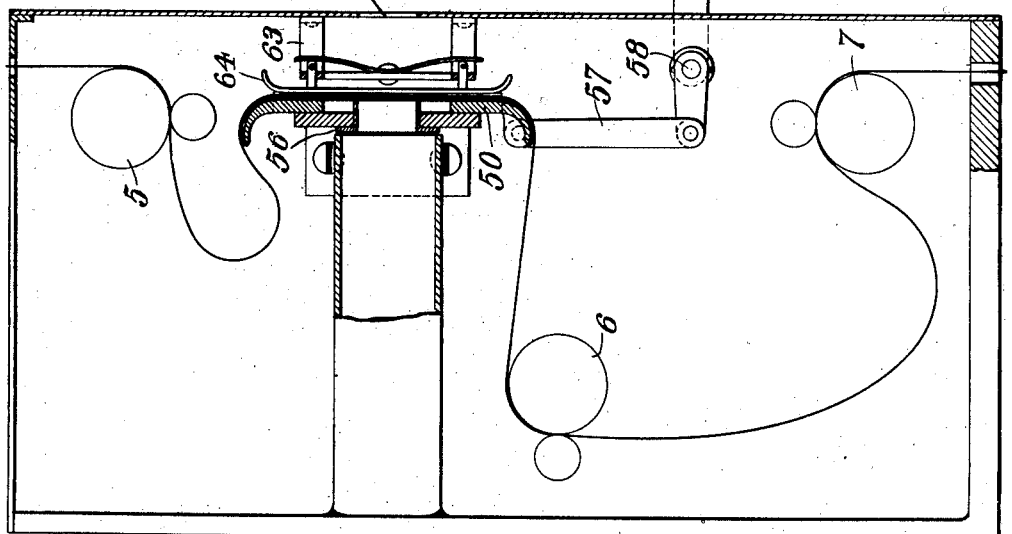

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

MOTION-PICTURE MACHINE.

1,423,452.  Specification of Letters Patent.  Patented July 18, 1922.

Application filed November 21, 1914, Serial No. 873,253. Renewed December 10, 1920. Serial No. 429,808.

*To all whom it may concern:*

Be it known that I, NICHOLAS POWER, a citizen of the United States, and a resident of the borough of Brooklyn, Kings County, New York, have invented new and useful Improvements in Motion-Picture Machines, of which the following is a specification.

This invention relates to moving picture projecting machines and has for its object a novel "framing" device which permits all the feed sprockets for the film and the projection aperture plate to be rigidly and immovably mounted on a frame whereby the machine frame may be constructed of a single rigid piece of ample strength and stiffness to maintain the alignment of the parts and obviate wear and consequent noise and imperfect operation.

My novel framing mechanism with all film-moving and shutter-operating parts in permanently fixed relation, permits very simple driving connections to be used, and greatly minimizes the liability to lack of synchronism between the shutter and the film-moving parts, which is a fault of not infrequent occurrence in the present commercial machines due to the compensating adjustments required by the present framing devices.

With the above object in view my invention consists of the construction illustrated in the accompanying drawings wherein, Fig. 1 is a side elevation of my improved machine;

Fig. 2 is a rear elevation partly in section of the machine shown in Fig. 1;

Fig. 3 is a plan view partly in section of the apparatus shown in Figs. 1 and 2;

Fig. 4 is a sectional view, partly diagrammatic, of a modified form of framing device;

Figs. 5 and 6 are detail views of the framing device shown in Fig. 4;

Fig. 7 is a detail view of the driving cam detached from the machine;

Fig. 8 is a vertical sectional view showing a modified form of framing device and also an enclosing casing for the machine;

Fig. 9 is a side elevation partly in section of the mechanism shown in Fig. 8; and Fig. 10 is a vertical sectional view of the film gate and associated parts at about the plane of the projection aperture.

Referring now to the drawings, and partly to Figs. 1, 2 and 3, 1 indicates the frame of the machine here shown as comprising a base plate 2 having a central vertical web 3 and a transverse vertical web 4 at the front edge of the base plate on the side of the web 3 provided with the film feeding sprockets as will be later described.

The film feeding sprockets are as usual three in number and comprise an upper continuously rotating sprocket 5, an intermittent sprocket 6, and a lower continuously driven sprocket 7. With the gearing shown all the sprockets are driven from a single vertical shaft 8 rotatably supported in brackets 9 projecting from the central web 3 near the top and bottom. The shaft 8 is driven from a crank handle 10 mounted near the upper edge of the web 3 and having a large skew gear 11 meshing with a small similar gear 12 attached to the shaft 8 whereby the shaft 8 is driven at sufficient speed without an excess speed of the handle.

The sprocket 5 is fixedly attached to its shaft 13 which is mounted in an elongated bearing 14 attached to the opposite face of the web 3. The shaft 13 projects through the web to a point adjacent the vertical shaft 8 where it is supported in a bearing carried by the bracket 9 and has attached to its free end a gear meshing with the gear 12 whereby the sprocket will be rotated continuously when the crank handle is operated.

The intermittent sprocket 6 is also mounted in an elongated bearing attached to the face of the web, but instead of being directly beneath the sprocket 5 as in the ordinary moving picture machine, the sprocket is near the forward edge of the machine. The shaft of the intermittent sprocket is provided on its projecting end immediately beyond the face of the web 3 with a four-arm cross 16, each arm of which has at its end an outwardly projecting pin 17. The pins 17 work in cam grooves formed in a barrel cam 18 fixedly attached to a horizontal shaft 19 extending at right angles to the shaft 13 and driven from the shaft 8 by suitable gears proportioned to rotate the shaft 19 at four times the speed of the shaft 13.

The cam 18 which is shown in detail in Figs. 3, and 7, is formed with a circumferential groove at each end of the cam, which grooves are connected by an inclined cam groove 20 for shifting the pins of the cross from one groove to the other. The circumferential grooves are each provided with an exit slot 21 and 22 through the outer flange of the cam to permit movement of the locking pins during the rotation of the cross. The cam rotates in the direction indicated by the arrow in Fig. 3 and at each passage of the cam groove 20 the cross will be rotated through a quarter of a revolution while during the remaining portion of the movement of the cam the cross will be held stationary by the engagement of two of its pins with the circumferential grooves. By properly curving the cam groove 20, the rate of acceleration of the movement of the intermittent sprocket may be made very gradual so as not to place undue strain upon the film. Also the stopping of the movement of the sprocket may be so regulated that the film will have no momentum but will come absolutely to rest, thereby causing each picture to absolutely register with the position of the preceding picture.

The lower continuously driven sprocket 7 is mounted in vertical line with the upper sprocket 5 near the base of the frame and is continuously driven from the shaft 8 by connections similar to the driving mechanism for the upper sprocket. From the lower sprocket the film passes through a slot in the base of the machine into the usual magazine, not shown, for receiving the same. Each of the sprockets is provided with the usual spring held roller 25 for holding the film in engagement with the teeth of the sprocket.

The aperture plate 26 is fixedly attached to the web 3 of the frame beneath the sprocket 5 and hinged to the plate is the gate 27 having at each edge a tension guide 28 for holding the film steady at the aperture. At the lower edge of the aperture plate the film passes over a vertically adjustable framing shoe 29 supported on rods 30 mounted for vertical adjustment in guides 31 formed on the back of the aperture plate. As shown the shoe 29 is provided at each edge with raised flanges 32 forming tracks for the edge of the film which maintain the film in the same vertical plane as the aperture plate. The flanges taper into the face of the shoe a sufficient distance below the edge of the aperture plate to permit the desired vertical movement of the shoe 29 which movement is effected by means of a crank arm 33 attached to a pin projecting through the web 3 and provided on its outer end with a framing handle 34. The framing handle is preferably held in adjusted position by means of the friction of the bearing of the pin which may be regulated in any desired manner as for instance by a friction plug or screw 35 set in the bearing. In its middle position of adjustment the lower edge of the shoe 29 is in line with the upper face of the intermittent sprocket 6 and by adjusting the framing handle to raise and lower the shoe 29 a greater or less amount of film may be taken up between the aperture and the sprocket to thereby frame the picture.

It will be observed that both the lower edge of the aperture plate and the upper ends of the guide flanges 32 curve away from the film so that in either direction of adjustment there will be no sharp edges to engage and injure the film. The pull of the film is at right angles to the direction of adjustment of the framing shoe whereby the framing shoe will remain in its adjusted position without tendency to displacement.

The projection lens indicated at 37 in Fig. 3 is attached to the web 4 in line with the projection aperture and in front of the lens is a rotary shutter 36 having segmental blades for alternately cutting off the light from the film during the time that the film is in motion. This shutter is attached to the end of the shaft 19 which carries the cam 18 whereby the shutter is maintained in absolute synchronism with the intermittent sprocket.

The friction of the film against the shoe 29 is in no way detrimental for the reason that it is necessary to apply to the film at the aperture a considerable amount of friction in order to take up the momentum of its rapid movement to insure proper registry of the successive pictures and I can therefore compensate for the friction of the shoe 29 by relieving to some extent the friction of the guide springs 28 so that the total resistance to movement is the same as with the adjustable carriage framing device of the present construction. It will of course be understood that the friction in all cases comes merely on the margins of the film as the aperture plate is provided with marginal flanges just sufficient in height to raise the surface of the central portion of the film off of the plate.

In the modification shown in Figs. 4, 5, and 6 I employ instead of the slidingly adjustable shoe 29 a pivoted framing guide 40 consisting of a plate or bar having fingers 41 adapted to project over the margins of the film passing over the bar. The bar 40 is pivotally mounted in the end of a yoke 42 attached to a pin 43 projecting through the web 3 of the machine and provided on its outer end with an adjusting arm 44 whereby the yoke may be oscillated to raise and lower the framing guide to vary the amount of film between the aperture and the intermittent sprocket. The arm 44 may be held in adjustable position by the friction of its pivot but for this construction I prefer to use a locking screw 45 working in a slot in the web of the frame and having a milled nut which will be released with a slight turn to permit movement of the framing guide. By pivoting the framing guide in its yoke it is free to adjust itself to the plane of the film whereby excessive strain on the film is avoided.

In Figs. 8 to 10 I have shown a further modification of my framing device and have also illustrated how the machine may be provided with a casing to completely enclose the film feeding mechanism to protect and safeguard the film against fire. The framing device as here shown comprises a plate 50 mounted for vertical adjustment on the aperture plate 51 which is provided with undercut guides at its edges to hold the plate 50 in place. One of the under-cut guides 52 is detachably mounted upon the plate 51 so as to be adjustable on suitable screws 53 to take up the wear on the contacting edges of the plate and guides and maintain sufficient friction upon the plate 50 to hold it in adjusted position. The plate 50 is curved at its ends over the top and bottom edges of the plate 51 so that the film is guided in an easy manner to and from the sprockets. The plate 50 is provided at its edges throughout the length of both its flat and curved faces with ribs 54 for holding the film against edgewise displacement, and immediately within the ribs 54 the plate is formed with tracks 55 engaging the margins of the film, and raised slightly above the middle portion of the plate to prevent scarring of the emulsion on the film. The plate 50 is provided with an elongated central aperture sufficient in extent to permit the movement of the plate necessary for properly framing the picture. The aperture is formed by a tubular guide 56 set in the aperture plate and having its rear edges terminating just out of contact with the face of the film whereby a sharp outline of the picture on the screen will be produced.

The framing device is operated by means of a link 57 connected to its lower end and attached to the crank arm upon the pin 58 projecting through the side wall of the casing and having on its outer end the usual framing handle 59.

I have shown in connection with this modification the arrangement of the casing when an enclosed machine is desired. As here shown the front and side walls of the frame form two sides of the casing, the other two sides being formed by a door having a rear part 60 and a side wall 61 hinged together at the corner and hinged to the side wall of the frame at 62. The rear part 60 of the door carries on its inner face a frame 63 which supports spring guide shoes 64 for holding the film at the aperture, and is provided with a latch 65 by which this part of the door may be held in operative position by engagement with a pin 66 on the aperture plate projecting through the door. The part 61 of the door will be provided with a suitable latch, not shown, for holding it in closed position so that the door and two walls of the casing form a substantially imperforate fire proof enclosure for the film in its passage through the machine. By constructing a door of two hinged parts, the side of the casing may be opened without opening the rear door, or the entire door may be opened to give ready access to all the parts of the machine, and when so opened the part 61 of the door may be interposed between the projecting arc and the film. The rear door 61 is of course provided with a suitable aperture as indicated at 66 in Fig. 8, which aperture will be preferably provided with a suitable safety shutter (not shown) such as is common in the art, closing the apertures when the machine is in operation.

It will be obvious that instead of the vertical shaft 8 for driving the sprocket and shutter shafts, I may connect them with the crank handle by means of ordinary spur and bevel gears. It will also be understood that my improved framing device may be used in connection with other forms of film driving mechanism or vice versa, and that my invention is not limited to the construction shown except as defined in the appended claims.

Having thus described my invention, what I claim and desire to secure by Letters Patent is:

1. In a moving picture machine, the combination of a frame, an intermittently operated film feeding sprocket supported in fixed position thereon, a plate having a projection aperture supported in fixed relation to said sprocket, and means having a film engaging surface stationary with regard to the movement of the film between said plate and sprocket for varying the length of film between said plate and said sprocket.

2. In a moving picture machine, the combination of a frame having a projection aperture, means for guiding said film vertically past said aperture, an intermittently operated sprocket supported on said frame in a different vertical plane from the plane of movement of the film part, and means having a film engaging surface stationary with regard to the movement of the film for varying the length of film between said plate and sprocket.

3. In a moving picture machine, the combination of a frame having a projection aperture, means for guiding said film vertically past said aperture, an intermittently operated sprocket supported on said frame in a different vertical plane from the plane of movement of the film part, and vertically movable means having a film engaging surface stationary with regard to the movement of the film for varying the length of film between said plate and sprocket.

4. In a moving picture machine, the combination of a frame having a projection aperture, an intermittently operated film feeding sprocket mounted in fixed relation to said aperture, and film guiding means having a film engaging surface stationary with regard to the movement of the film mounted between said aperture and sprocket and movable in the plane of movement of the film past said aperture for varying the length of film between said aperture and sprocket.

5. In a moving picture machine, the combination of a frame having a projection aperture, a stationary film guide adjacent said aperture for maintaining the film in its proper plane of movement across said aperture, an intermittently operated sprocket beyond said aperture, and an adjustable film guide between said aperture and sprocket and having a film engaging surface stationary with respect to the movement of the film in the same plane as the stationary guide.

6. In a moving picture machine, the combination of a frame having a projection aperture, a stationary film guide adjacent said aperture for maintaining the film in its proper plane of movement across said aperture, an intermittently operated sprocket beyond said aperture and out of the plane of said guide, and an adjustable film guide between said aperture and sprocket and having a film engaging surface in the same plane as the stationary guide and curving toward said sprocket, said surface being stationary with regard to the movement of the film.

7. In a moving picture machine the combination of a frame having a projection aperture, a stationarily supported film feeding member below said aperture, a film guide for maintaining the film in its proper plane of movement across said aperture comprising a member having film engaging guide tracks supported for vertical adjustment in said frame with the tracks at the sides of the aperture for engaging the margin of the film, and a film engaging member having parts for engaging the opposite faces of the film margins and yieldingly pressing them against the tracks of said first mentioned member, said first mentioned member being shaped to vary the length of the film path between the aperture and the film feeding member upon vertical movement of said first mentioned member.

8. In a moving picture machine the combination of a frame having a projection aperture, a stationarily supported intermittently rotated sprocket for feeding the film past said aperture, a film guide at said aperture comprising film-engaging tracks mounted for vertical movement on each side of said aperture, and a gate having spring-pressed tracks for engaging the opposite faces of the film margins and pressing the film against said tracks, said tracks being shaped to vary the length of film between said aperture and said sprocket upon vertical movement thereof.

Signed at New York, in the county of New York and State of New York this 6th day of November, 1914.

NICHOLAS POWER.

Witnesses:
W. B. MORTON,
CHARLES J. CAROLA.